(12) United States Patent
Schmitt et al.

(10) Patent No.: US 11,089,791 B2
(45) Date of Patent: Aug. 17, 2021

(54) METHOD OF PRODUCING A DAIRY CONCENTRATE WITH FREE DIVALENT CATIONS PROTEIN AGGREGATION

(71) Applicant: NESTEC S.A., Vevey (CH)

(72) Inventors: Christophe Joseph Etienne Schmitt, Servion (CH); Lionel Jean Rene Bovetto, Lucens (CH); Axel Syrbe, Clarens (CH); Markus Kreuss, Freimettigen (CH); Madansinh Nathusinh Vaghela, Macedonia, OH (US); Eric Stanislas Kolodziejczyk, Vevey (CH)

(73) Assignee: Societe des Produits Nestle S.A., Vevey (CH)

(*) Notice: Subject to any disclaimer, the term of this patent is extended or adjusted under 35 U.S.C. 154(b) by 73 days.

(21) Appl. No.: 16/462,448

(22) PCT Filed: Dec. 18, 2017

(86) PCT No.: PCT/EP2017/083353
§ 371 (c)(1),
(2) Date: May 20, 2019

(87) PCT Pub. No.: WO2018/114826
PCT Pub. Date: Jun. 28, 2018

(65) Prior Publication Data
US 2019/0373907 A1    Dec. 12, 2019

(30) Foreign Application Priority Data
Dec. 19, 2016    (EP) .................................... 16205142

(51) Int. Cl.
*A23C 9/152*    (2006.01)
*A23C 1/04*    (2006.01)
(Continued)

(52) U.S. Cl.
CPC .............. *A23C 9/1522* (2013.01); *A23C 1/04* (2013.01); *A23J 1/205* (2013.01); *A23J 3/10* (2013.01)

(58) Field of Classification Search
CPC ..... A23C 9/1512; A23C 9/1522; A23C 9/154; A23C 21/06; A23L 29/231; A23L 29/281;
(Continued)

(56) References Cited

U.S. PATENT DOCUMENTS

2011/0311703 A1* 12/2011 Ummadi .................. A23G 9/38
426/565
2012/0164277 A1*  6/2012 Robinson ................ A23L 33/10
426/72

(Continued)

FOREIGN PATENT DOCUMENTS

WO    2010092091    8/2010
WO    2012016853    2/2012
(Continued)

OTHER PUBLICATIONS

Riou et al. "Behavior of Protein in the Presence of Calcium during Heating of Whey Protein Concentrate Solutions" Journal of Agricultural and Food Chemistry, 2011, vol. 59, pp. 13156-13164.
(Continued)

*Primary Examiner* — Brent T O'Hern
(74) *Attorney, Agent, or Firm* — K&L Gates LLP

(57) ABSTRACT

The invention relates to a method of producing a dairy concentrate, comprising the steps of: providing an ingredient composition comprising micellar caseins and whey proteins and having a pH of 6.1-7.1 and a concentration of 3-25 wt. % of proteins, and wherein the ingredient composition has a casein to whey protein ratio of 90/10-60/40, adding 3-25 mM divalent cations to provide a concentration of 3-8 mM free divalent cations in the ingredient composition, homoge-
(Continued)

nising the ingredient composition; and subsequently pasteurising and stirring the ingredient composition at a temperature of 80°-105° C. for a period of 0.5-3 min to form agglomerated proteins comprising caseins and beta-lactoglobulin from the whey proteins, the agglomerates having a size of 3-50 microns as measured by D(4,3) mean diameter. The invention also relates to a method with an ultra-high temperature treatment of the ingredient mix. Furthermore, the invention relates to a dairy concentrate comprising aggregated proteins comprising micellar casein and whey protein aggregates, wherein the product has a pH of 6.0-7.1, a concentration of 6-55 wt. % milk solids, a casein to whey protein ratio of 90/10-60/40, and a concentration of 3-8 mM free divalent cations, and wherein the agglomerates having a size of 3-50 microns mean diameter D(4,3) as measured by laser diffraction.

15 Claims, 10 Drawing Sheets

(51) Int. Cl.
A23J 1/20 (2006.01)
A23J 3/10 (2006.01)
(58) Field of Classification Search
CPC ...... A23L 29/238; A23L 29/25; A23L 29/272; A23L 2/66
USPC ....................................................... 426/583
See application file for complete search history.

(56) References Cited

U.S. PATENT DOCUMENTS

2017/0367361 A1* 12/2017 Kapchie ................. A23C 9/154
2018/0220667 A1* 8/2018 Sher ........................ A23L 2/66

FOREIGN PATENT DOCUMENTS

| WO | 2012017043 | 2/2012 |
| WO | 2016102500 | 6/2016 |
| WO | 2016102501 | 6/2016 |
| WO | 2016102503 | 6/2016 |
| WO | 2016174651 | 11/2016 |
| WO | 2017021428 | 2/2017 |
| WO | 2017032817 | 3/2017 |

OTHER PUBLICATIONS

Ni et al. "Effect of temperature, calcium and protein concentration on aggregation of whey protein isolate: Formation of gel-like micro-particles" International Dairy Journal, 2015, vol. 51, pp. 8-15.
Zabodalova et al., "Technology of Whole Milk Products and Ice Cream", 2013, pp. 24-25 and 64-67.
Office Action Received for Application No. RU2019115969, dated Mar. 15, 2021, 12 Pages(5 Pages of English Translation and 7 Pages of Official Copy).

* cited by examiner (A)

(B)

(C)

(A)

(B)

METHOD OF PRODUCING A DAIRY CONCENTRATE WITH FREE DIVALENT CATIONS PROTEIN AGGREGATION

CROSS REFERENCE TO RELATED APPLICATIONS

The present application is a National Stage of International Application No. PCT/EP2017/083353, filed on Dec. 18, 2017, which claims priority to European Patent Application No. 16205142.9, filed on Dec. 19, 2016, the entire contents of which are being incorporated herein by reference.

FIELD OF THE INVENTION

The present invention relates to a method of producing a dairy concentrate, in particular to a method for forming agglomerated proteins in an ingredient composition. The invention also relates to a dairy concentrate comprising aggregated proteins comprising micellar casein and whey protein aggregates.

BACKGROUND

It is known to provide texture and mouthfeel to food and beverage product by protein aggregation and there continue to be a need for food and beverages products exhibiting nutritional balance of macronutrients while delivering great taste and texture.

Mouthfeel and creaminess, as well as reduction of fat, are key drivers of liking for milk based products such as cream and products derived from cream. Today, there is a challenge to increase the mouthfeel/creaminess of present creams, in particular to achieve such increase in mouthfeel/creaminess using all-natural formulations or ideally by acting on the product matrix itself, instead of adding ingredients to the product. This is particularly true in low and no fat products.

CN104489097A describes a process to obtain a heat convection drying protectant preparations for lactic bacteria or probiotics consisting in heat treating at 60° C. a milk preparation enriched with calcium in order to induce protein aggregation and subsequently submitting the preparation to a mechanical homogenization treatment. This patent application does not relates to dairy concentrates.

WO07040113A describes the production of an ingredient exhibiting high content in milk-derived complex lipids. It is obtained by precipitating the protein fractions of butter serum at pH 4.0-5.0 in presence of calcium and filtering the supernatant in order to concentrate the complex lipids.

WO 06065135 A2 disclosing the production of a free divalent cations-rich liquid food product in which 20% of the lysine residues carried out by the proteins have been glycosylated in order to increase their resistance to aggregation in presence of calcium. Therefore, WO 06065135 A2 is related to preventing protein aggregation in presence of divalent cations, calcium among others.

US20130011515 A1 is describing a process for the production of a milk protein concentrate which is enriched with whey proteins. Skimmed milk is heated in the pH range 6.5-7.0 in order to promote aggregation of whey proteins together with caseins. The heated product is subsequently submitted to filtration in order to concentrate protein aggregates and to remove lactose.

D. L. Van Hekken et al. [Rheology and Microstructure of Chemically Superphosphorylated Whole Casein, 1997, J. Dairy Sci. 80 2740-2750.] describe the effect of addition of free calcium on the viscosity of superphosphorylated caseins. It was shown that the viscosity of a 4 wt. % superphosporylated caseins (190% phosphorylation) increased by addition of 30 mM calcium at pH 8.4. This study does not relate to dairy concentrates. Further, for dairy concentrates the superphosporylated caseins are not desirable relevant as chemically modified and expensive ingredient.

C. Holt described in his paper [An equilibrium thermodynamic model of the sequestration of calcium phosphate by casein micelles and its application to the calculation of the partition of salts in milk, 2004, Eur. J. Phys., 33, 421-434] reported that the amount of free calcium ions in bovine milk at pH 6.70 was 10.2 mM and that this value decreased to 8 mM when milk pH decreased to 6.0.

I. R. McKinnon et al. [Diffusing-wave spectroscopy investigation of heated reconstituted skim milks containing calcium chloride, 2009, Food Hydrocolloids, 1127-1133] investigated the effect of calcium chloride addition to skimmed milk reconstituted at 10 wt. % in the pH range 6.0-7.2 and the subsequent effect on viscosity when the milks were heated for 10 minutes at 60, 75 and 90° C. They reported a critical instability pH of 5.9 for the milks upon heating at 90° C. for calcium chloride content up to 10 mM.

L. Ramasubramanian et al. [The rheological properties of calcium-induced milk gels, 2014, J. Food Engineering, 45-51] determined the impact of calcium chloride addition into full fat milk (3.5% fat) upon heating at 70° C. It was reported that calcium chloride addition below 12.5 mM was leading to viscous dispersions while higher calcium chloride concentrations induced formation of stronger gels. Interestingly, pre-treatment of the milk at 90° C. for 10 minutes before calcium chloride addition and subsequent heating at 70° C. was leading to the strongest gels. Gel formation is not desirable in many semi-solid food and beverage products.

T. Phan-Xuan et al. [Tuning the structure of protein particles and gels with calcium or sodium ions. 2013, Biomacromolecules, 14, 6, 1980-1989.] reported when treating 100% whey protein (beta-lactoglobulin) with an addition of calcium chloride at pH 7.0 it was leading to microgels or gel formation upon heating at 68 or 85° C. when calcium content was 5-6 mM for a protein concentration of 4 wt. %. Again gel formation is not desirable in many semi-solid food and beverage products.

The prior art teaching shows that although viscosity may be obtained with calcium addition gelling of is a well-known effect which may be undesirable in food production. Furthermore, the pH of the product may vary and influence process and may lead to instability of the product. The prior art does not show how to provide food and beverage products delivering desirable taste and texture.

Thus, there is a need for food and beverage products exhibiting nutritional balance of macronutrients while delivering great taste, texture and shelf stability.

OBJECT OF THE INVENTION

It is thus the object of present invention to provide a dairy concentrate with improved texture and mouthfeel and a method of making it.

SUMMARY OF THE INVENTION

The present invention provides the improvement by the use of milk protein-based aggregates by specific heat treatment in the presence of a specific concentration of added divalent cations. It was surprisingly found that there is a critical range of divalent cations addition leading to optimum protein aggregation without precipitation or gelation of the formed aggregates upon heating.

In a first aspect, the invention relates to a method of producing a dairy concentrate, comprising the steps of:

providing an ingredient composition comprising micellar caseins and whey proteins and having a pH of 6.1-7.1 and a concentration of 3-25 wt. % of proteins, and wherein the ingredient composition has a casein to whey protein ratio of 90/10-60/40, adding 3-25 mM divalent cations to provide a concentration of 3-8 mM free divalent cations in the ingredient composition, homogenising the ingredient composition; and subsequently pasteurising and stirring the ingredient composition at a temperature of 80°-105° C. for a period of 0.5-3 min to form agglomerated proteins comprising caseins and beta-lactoglobulin from the whey proteins, the agglomerates having a size of 3-50 microns as measured by $D_{(4,3)}$ mean diameter.

The present invention uses milk protein-based aggregates that are generated upon heat treatment in presence of added-free divalent cations in order to deliver optimum sensorial properties while allowing a reduction of the total fat content in the product. In addition, the described invention enables formulation of dairy-based concentrated texturized products without the use of additional stabilizers or hydrocolloids.

In a second aspect the invention relates to a dairy concentrate comprising aggregated proteins comprising micellar casein and whey protein aggregates, wherein the product has a pH of 6.0-7.1, a concentration of 6-55 wt. % milk solids, a casein to whey protein ratio of 90/10-60/40, and a concentration of 3-8 mM free divalent cations, and wherein the agglomerates having a size of 3-microns mean diameter $D_{(4,3)}$ as measured by laser diffraction.

In a further aspect, the invention relates to method of producing a dairy concentrate, comprising the steps of:

providing an ingredient composition comprising micellar caseins and whey proteins and having a pH of 6.1-7.1 and a concentration of 3-25 wt. % of proteins, and wherein the ingredient composition has a casein to whey protein ratio of 90/10-60/40, adding 3-25 mM divalent cations to provide a concentration of 3-8 mM free divalent cations in the ingredient composition, homogenising the ingredient composition; and subsequently pasteurising and stirring the ingredient composition at a temperature of 120°-150° C. for a period of 3-30 seconds to form agglomerated proteins comprising caseins and beta-lactoglobulin from the whey proteins, the agglomerates having a size of 3-50 microns as measured by $D_{(4,3)}$ mean diameter.

This method provides an ultra-high temperature treatment (UHT) of the ingredient mix. This method is suitable for e.g. evaporated milk or culinary creamers. The discussion of the method of the invention below also applies to this method.

In yet a further aspect, the invention relates to the use of a dairy concentrate as described in this application for use in for producing powdered Growing up milks, culinary sauces, coffee mixes, tea creamer, ice cream or cocoa-malt beverages.

DETAILED DESCRIPTION OF THE INVENTION

Figure 1:
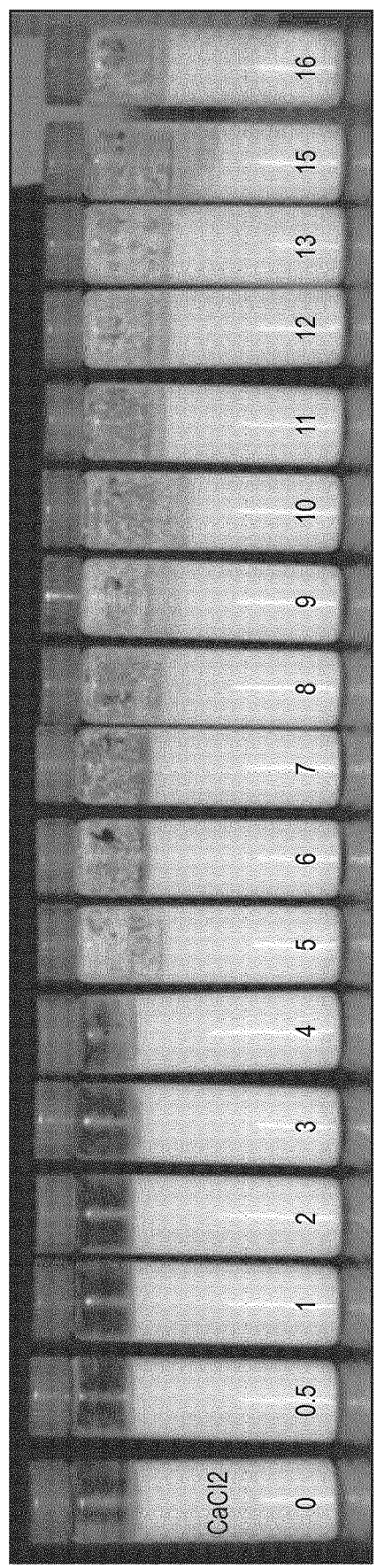
FIG. 1 shows the glass tubes after heat treatment of 3.5 wt. % milk at 90° C. for 15 minutes upon addition of calcium chloride. The labels on the tubes represent the amount of free calcium in mM added in the sample. The critical free calcium concentration to induce protein aggregate formation leading to viscosity increase was 3.7 mM, corresponding to 4 mM CaCl2 addition.

When carrying out experiments on the effect of divalent cations addition, in particular calcium, to full fat milk on protein aggregation and viscosity built up, it was surprisingly found that there is a critical range of divalent cations addition leading to optimum protein aggregation without precipitation or gelation of the formed aggregates upon heating. When this optimum concentration of calcium is passed, the system either exhibited over-aggregation with precipitation or a decrease of aggregate size.

Without being bound to theory, it is likely that calcium chloride addition to proteins is leading to an exchange between the protons adsorbed at the surface of the proteins and the calcium ions which have a higher affinity. This phenomenon resulted in a decrease of the pH of the dispersion and thereby a decrease of electrostatic repulsions between proteins. In these conditions, subsequent heat treatment of milk or milk based dispersions and emulsions is leading to a controlled aggregation of the proteins which was shown to affect positively the textural and sensorial properties of the finished products.

A major advantage of this invention is that it allows to texturize reduced fat milk-protein based concentrates and enables a reduction or elimination of the use of additional hydrocolloids and/or emulsifiers.

In the present context the agglomerates created with the method according to the invention and present in the product of the invention have a size of 3-50 microns, preferably 5-50 microns, more preferably 5-10 microns, as measured by $D_{(4,3)}$ mean diameter. The agglomerate particle size distribution is measured (PSD) using a laser granulometer such as a Mastersizer 2000 (Malvern Instruments, UK). For the measurements a sample may e.g. be dispersed in the Hydro SM measuring cell until an obscuration rate of 9-10% is obtained and then analysed in the Mastersizer.

Further in the present context the free divalent cations may be measured by means of a selective electrode. For example, free (ionic) calcium concentration is determined a Mettler Toledo calcium selective electrode perfection™ DX series half cells with BNC connector P/N 51344703 connected to a 692 pH/Ion meter (Metrohm Switzerland).

Further in the present context unless otherwise indicated % of a component means the % of weight based on the weight of the composition, i.e. weight/weight %.

In addition by "dairy concentrate" may be a dairy culinary product, a soup or soup base, a dessert, a whipping cream, a tea or coffee creamer or enhancer, a dairy component in coffee mixes and dairy component for use in a beverage system such as a beverage vending system.

Furthermore, in the present context "stirring" means moving the ingredient composition. The stirring may result in a shearing of the ingredient composition. If it does it is preferred that this is done without destroying the agglomerates.

In a preferred embodiment of the invention the aggregates are 5-30 microns, preferably 5-10 microns. This give a desirable mouth feel to the product without the aggregates providing grittiness.

In accordance with the invention it is preferred that the divalent cations are selected from the group consisting of Ca and Mg cations or a combination thereof. These divalent cations are food grade and do not contribute to increase fat oxidation.

In a preferred embodiment of the invention the divalent cations are calcium cations.

Advantageously, the divalent cations are added until the free divalent cations concentration is 3.5-6.5 mM divalent cations. It has been found that amounts that need to be added in dairy concentrate are 3-25 mM.

Furthermore, it is preferred that the divalent cations are added in form of a mineral salt. Preferably the mineral salt is calcium salt is selected from the group consisting of calcium chloride, calcium lactate calcium gluconate or calcium phosphate. In a particular preferred embodiment of the invention the calcium salt is calcium chloride.

In an all-natural embodiment of the invention the calcium is obtained from concentrated minerals from milk after separation of the protein, fat and lactose by e.g. membrane fractionation.

In accordance with the invention the pH of the ingredient composition is preferably 6.2-7.1 before adding the calcium cations.

The content of soluble protein in the ingredient composition is preferable below or equal to 30% in relation to the total protein content indicating that the majority of the proteins are in the form of aggregates.

In one embodiment of the invention the ingredient composition comprises from 0-50 wt. % fat, preferably 1.0-20 wt. %, more preferably 3.0-15 wt. %, most preferably 5-10 wt. % of fat. It has been found that even with low amounts of fat the texture of the product is still perceived as creamy due to the agglomeration created within the product.

The caseins and whey protein in the ingredient composition are preferably provided in a form selected from the group consisting of raw milk, pasteurized milk, low heat concentrated milk, low heat milk powder, milk protein concentrate, milk protein isolate in liquid or powder format or a combination thereof while the additional whey proteins are provided in a form selected from the group consisting of sweet dairy whey, whey protein concentrates, whey protein isolates in liquid, concentrate or powder format or a combination thereof.

It has been found that the method according to the invention is particular useful for making dairy concentrates. In this embodiment of the invention the ingredient composition is a concentrate comprising 6-55, preferably 25-50 wt. % milk solids.

The invention also relates to a dairy concentrate obtained by the above described method.

In a particular preferred embodiment of the invention the concentrate is dried into powder by means of freeze drying, spray drying or roller-drying.

It was surprisingly found that the addition of divalent cations and the process conditions of the present invention form agglomerates with the casein micelles, which results in increased colloidal particle size, water binding and overall viscosity. Surprisingly the structure and function after drying the composition is maintained. It was observed that current high pressure spray drying conditions for standard milk powder manufacture resulted in high shear effect that destroyed the controlled aggregation of proteins and thus the functionality during spray drying process.

Several types of atomization are known for spray drying such as centrifugal wheel, hydraulic (high) pressure-nozzle, pneumatic (two phase nozzle) and sonic atomization. The term "low pressure drying system" refers to centrifugal wheel or pneumatic atomization systems which protects the structure of the casein-whey protein aggregates. It has been observed that high pressure atomizers such as hydraulic (high) pressure-nozzle atomization results in shearing effect thus destroying the casein-whey protein aggregates and thus its unique functionality. Such high pressure atomizers are useful for making conventional milk powders; however such a high-pressure system is not suitable for producing samples of the present invention. It has however been found that spray drying using low pressure drying system preserves the functionality of the product. The low pressure nozzles may operate below 100 bars, more preferred below 50 bars, preferably below 20 bars.

In another aspect of the invention discussed above the invention relates to a dairy concentrate comprising aggregated proteins comprising micellar casein and whey protein aggregates, wherein the product has a pH of 6.01-7.1, a concentration of 6-55 wt. % milk solids, a casein to whey protein ratio of 90/10-60/40, and a concentration of 3-8 mM free divalent cations, and wherein the agglomerates having a size of 5 3-50 microns mean diameter D(4,3) as measured by laser diffraction.

A preferred concentration of the product is 25-50 wt. % in the ingredient mix. Preferably the agglomerates have a size of 5-10 microns mean diameter D(4,3) as measured by laser diffraction For this product it is preferred that the product has free divalent cations in the product is 3.5-6.5 mM. The divalent cations is preferably selected from divalent cation Ca and Mg or a combination thereof.

In the product according to the invention it is advantageously that the content of soluble protein in the product is below or equal to 30% as related to the total protein content.

Furthermore, it is preferred that product comprises from 0-20 wt. % fat, preferably 2.0-15 wt. %, most preferably 2.5-10 wt. % of fat. It has been found that even at 0 or low fat content products with a desirable mouth feel can be obtained. The product according to the invention may have initial fat (present before heat treatment) droplets having a size of 0.5-2.0 microns are flocculated in protein aggregates of 5-50 microns.

The product according to the invention may have an at least partially aggregated protein system which is obtained by subjecting a composition to a heat treatment 80°-105° C. for a period of 0.5-3 minutes.

The micellar casein may be obtained from the group consisting of milk, milk protein concentrate and isolate in a liquid or powder form or a combination thereof.

Products according to the invention may be dairy based products such as ice cream or frozen confection, dairy concentrates or desserts, sauces etc. The product format includes frozen, ambient, liquid and powder.

EXAMPLES

By way of example and not limitation, the following examples are illustrative of various embodiments of the present invention.

Example 1

Milk Protein-Based Aggregates obtained by Calcium Chloride Addition in Heated Full Fat Milk.

Material and Methods

Chilled pasteurised and microfiltered full fat milk (3.5 wt. % fat) was provided by Cremo S.A. (Le Mont-sur-Lausanne, Switzerland). It had an initial pH of 6.77 as measured at 25° C. For calcium addition a solution of CaCl2, 2(H20) (Merck, Darmstadt, Germany) was prepared at 200 mM in MilliQ water. A volume 50 mL of milk were introduced in a Pyrex glass bottle of 50 ml (Schott Duran type, Germany) for each calcium chloride solution addition to cover a free calcium addition ranging from 1-16 mM. Magnetic stirring was performed 300 rpm and at room temperature 20-23° C.

After calcium chloride addition, 20 mL of milk were introduced in a 22 mL sealed glass tube containing a magnetic barrel. The closed tubes were partially (⅔) immerged for 15 min in a water bath regulated at 92.5° C. in order to reach a product temperature of 90° C. in 3 minutes. The incubation was done under magnetic stirring (500 rpm) to ensure shearing of the samples. After incubation the tubes were transferred in iced water for cooling.

The capillary viscosity was determined using Rheotest LK 2.2 (Medingen GmbH, Dresden, Germany) and the particle size distribution (PSD) using Mastersizer 2000 (Malvern Intruments, UK).

The direct visual appearance of the tubes was done to detect the first free calcium chloride concentration where protein aggregates were formed. Ionic (free) calcium concentration after heating was determined a Mettler Toledo calcium selective electrode perfection™ DX series half cells with BNC connector P/N 51344703 connected to a 692 pH/Ion meter (Metrohm Switzerland).

Results

TABLE 1

Initial pH, particle mean diameters and viscosity of full fat milk before and after heating at 90° C. for 15 min.

| CaCl2 added (mM) | pH | D[4,3] - Volume weighted mean (um) | D[3,2] - Surface weighted mean (um) | η (mPas) 20° C. | +/− | free Ca++ (mM) | final pH | D[4,3] - Volume weighted mean (um) | D[3,2] - Surface weighted mean (um) | η (mPas) 20° C. | +/− |
|---|---|---|---|---|---|---|---|---|---|---|---|
| 0 | 6.77 | 0.632 | 0.359 | 1.99 | 0.04 | 1.99 | 6.63 | 0.648 | 0.369 | 2.06 | 0.07 |
| 0.5 | nd | nd | nd | nd | nd | 2.20 | 6.67 | 0.599 | 0.308 | 2.13 | 0.06 |
| 1 | nd | nd | nd | nd | nd | 2.53 | 6.66 | 0.609 | 0.315 | 2.11 | 0.06 |
| 2 | nd | nd | nd | nd | nd | 2.93 | 6.63 | 0.598 | 0.302 | 2.07 | 0.06 |
| 3 | nd | nd | nd | nd | nd | 3.41 | 6.58 | 0.624 | 0.294 | 2.08 | 0.05 |
| 4 | nd | nd | nd | nd | nd | 3.77 | 6.54 | 42.80 | 6.20 | 2.43 | 0.06 |
| 5 | nd | nd | nd | nd | nd | 4.24 | 6.50 | 217.27 | 190.52 | 3.52 | 0.04 |
| 6 | nd | nd | nd | nd | nd | 4.50 | 6.46 | 296.74 | 207.63 | 3.92 | 0.02 |
| 7 | 6.61 | 0.625 | 0.349 | 1.88 | 0.02 | 5.25 | 6.44 | 207.09 | 35.19 | 3.93 | 0.08 |
| 8 | nd | nd | nd | nd | nd | 5.80 | 6.41 | 138.98 | 40.72 | 4.80 | 0.11 |
| 9 | nd | nd | nd | nd | nd | 6.36 | 6.40 | 134.17 | 44.42 | 5.31 | 0.13 |
| 10 | nd | nd | nd | nd | nd | 6.91 | 6.37 | 113.03 | 41.19 | 6.30 | 0.20 |
| 11 | nd | nd | nd | nd | nd | 7.55 | 6.34 | 123.64 | 37.74 | 6.27 | 0.19 |
| 13 | nd | nd | nd | nd | nd | 8.09 | 6.30 | 177.75 | 55.80 | 5.79 | 0.51 |
| 14 | nd | nd | nd | nd | nd | 8.89 | 6.28 | 155.64 | 54.94 | 6.27 | 0.24 |
| 15 | nd | nd | nd | nd | nd | 9.35 | 6.27 | 269.81 | 79.34 | 6.12 | 0.40 |
| 16 | 6.36 | 0.528 | 0.253 | 1.86 | 0.05 | 10.10 | 6.24 | 173.10 | 58.53 | 5.89 | 0.20 | nd: not determined

It can be seen from Table 1 that the original milk already contained 2 mM free ionic calcium in the form of soluble colloidal calcium. The addition of CaCl2 in milk was leading to an increase in free ionic calcium but also to a decrease of pH after heating. Up to an added calcium chloride concentration of 4 mM (corresponding to 3.8 mM measured free calcium) the particle size in the heat milk remained around 600 nm for D43 and 300 nm for D32 which is corresponding to the size of protein coated milk fat droplets and to the casein micelles. Above this critical CaCl2 value, larger particles are being formed reaching hundreds of microns for D43 and D32. These aggregates are visible on the surface of the glass tubes in FIG. 1. Surprisingly, the size of protein-based aggregates reaches a maximum at about 6 mM CaCl2 and then decreased steadily while more calcium was present in the system. The viscosity of the system increases with the increase of the calcium chloride content. Systems did not gel proving that the interactions between the protein aggregates could be controlled by applying shearing in the tubes while heating.

Example 2

Calcium Addition in Milk Protein Concentrate Stabilized Emulsions

Material and Methods

The stock solution of micellar caseins dispersion was prepared at a protein concentration of 10 wt. %. Micellar caseins concentrate Promilk852B (batch 13610656) was purchased from Ingredia (Arras, France). The powder composition was (g/100 g wet powder): protein (N×6.38) 82.3, Ca 2.6, Mg 0.1, Na 0.07, K 0.29, Cl 0.05, P 1.56. The mass of powder needed to prepare the dispersion was calculated as a function of the protein content in the powder.

Micellar casein powder was hydrated in MilliQ water for 3 hours under stirring at the room temperature. After 3 hours, the protein dispersion was homogenized with an EmulsiFlex C-5 high pressure, single-stage homogenizer (Avestin®, Canada). This treatment decreased the average particle size of micellar caseins and the amount of non-sedimentable caseins (K, αs1; and αs2) in serum increases, it allows to stabilize the solution and avoids the sedimentation of the MCI.

The average particle diameter was determined after the homogenization using a Nanosizer ZS (Malvern Instruments®, UK) and it was monodisperse and around 250 nm.

Emulsion Preparation

O/W emulsions were prepared by the addition of high oleic sunflower oil (Oleificio Sabo, Manno, Switzerland) to the proteins dispersions so that total sample resulted in oil content of 2.5, 5 and 10 wt. % and a constant protein content of 3 wt. %. The mixtures were subsequently pre-homogenized using an Ultra-Turrax T25 basic (IKA®, Switzerland) at 11,000 rpm/min during 1 minute for a volume of 500 mL. The pre-homogenized emulsions were after homogenized at High Pressure with a PandaPLUS HomoGenius 2000 (GEA®, Germany) adjusted at 50 bars for the first valve and at 250 bars for the second one, to obtain a pressure total of 300 bars.

Emulsions were homogenized twice by this method. After homogenization, pH and concentration of CaCl2 were adjusted to defined target values. Samples with different pH were heated up at 95° C. during 15 min in a hot water bath just after have been prepared and 1 hour after for different concentration of CaCl2. Emulsions were after cooled in iced-water during 20 min and stored at 4° C. during 1 hour.

The samples were afterward sheared at 16,000 rpm during 2 min using a Ultra-Turrax T25 basic (IKA®, Switzerland) in a beaker for a volume of 60 mL, thirty circles were applied in order to have the same shearing for all the volume. Emulsions were after stored at 4° C. until the analyses were done.

Particle Size Distribution

In order to assess particles size distribution, dispersions and emulsions were analyzed after shearing by dynamic light scattering using a MasterSizer 3000 (Malvern Instruments Ltd®, UK). The emulsion sample was dispersed in the Hydro SM measuring cell until an obscuration rate of 9-10% was obtained. Non-heated and heated samples were analyzed. Measures were performed three times and the average of the three replications was reported.

Microstructure of Protein Aggregates

Cryo-Sectioning of Samples

Cryogenic cuts were done in order to analyze samples by CLSM. To this aim, sucrose and formaldehyde were added at the samples in order to conserve them (PRICE and JEROME, 2011). Percentage are for the sucrose 30 wt. % of the total volume and 3.7 wt. % for the formaldehyde. Samples were homogenized using a vortex and stored overnight at 4° C. before beginning analyses.

Afterwards, samples were fixed. This step consisted of adding 0.5 g of the sample in 1 g of Optimum Cutting Temperature (OCT) Compound for Cryostat Sectioning, Tissue-Tek®. The composition was homogenized and 0.1 g were added in the cryostat sample holder, itself containing already OCT Compound for Cryostat Sectioning, Tissue-Tek®.

The cryostat sample holder was immersed in a plastic vial containing 80 mL of 2-Methylbutane (99% from Sigma Aldrich®, US), itself immersed in Sagex box of nitrogen liquid. The solution of 2-Methylbutane ensures a good freezing of the sample and protects it from the drying.

Samples were then placed in a Cryostat CM 3050 (Leica®, Switzerland). Microtome cuts were afterwards done at 7 μm of thickness at −21° C. Microscope slides were conserved in a freezer at −20° C. until the analyses were performed.

Microscope slides were previously treated with HistoGrip (50× concentrate from ThermoFisher Scientific®, US) for adhering tissue to glass slides and avoid to remove tissues during harsh processes.

Confocal Scanning Laser Microscopy

In order to distinguish proteins and fat globules, individual samples 100/0 (MCI/SPI) and 0/100 (MCI/SPI) were labelled with dyes.

Fast Green was used to color proteins and Nile Red for fat globules. According to FOWLER et al., 1985, Nile Red is an excellent dye for the detection of intracellular lipid droplets by fluorescence microscopy, it is highly hydrophobic and fluorescent. 25 mg of Nile Red was solubilized in 100 mL of ethanol. The excitation wavelength was achieved using the 488 nm emission from the diode laser and the emitted light was collected between 488 nm and 630 nm.

Fast Green is an organic dye, electrostatically attracted to charged groups on proteins (MERRIL and WASHART, 1998).

It can bind non-covalently to the biopolymer of interest by electrostatic interactions (AUTY, 2013). The excitation wavelength was set using the 633 nm emission from the diode laser and the emitted light was collected between 633 nm and 740 nm. The Fast Green used was at 1 wt. % in water.

Samples were dyed with a mix of Nile Red (100 μL) and Fast Green (3 mL). The mix was put on the microscope slides for 10 min and rinsed. Slides were mount with a set mounting Vectashield Hard Set Mounting Medium (Vector Laboratories®, US).

Microscope slides were after analyzed using a Zeiss® LSM 710 Confocal Scanning Microscope (Zeiss®, Germany). The CLSM is equipped with lasers allowing the excitations of several fluorescent probes at the same time, this capability allows multi-imaging of a sample by selecting the correct excitation wavelength and filters to collect the emission light from a particular dye. A 10×/0.45∞/0.17/PL APO and 63×/1.4 oil/DIC 420782-9900/PL APO was used for all images.

Flow Properties

One day after shearing, flow experiments were performed using a controlled stress rheometer Physica MCR501 (Anton Paar®, Austria) with concentric cylinders geometry CC27-SS/S (diameter=27 mm, gap=1.14 mm by Anton Paar®, Austria).

Steady state flow measurements were conducted in a constant temperature of 25° C., a shear stress of 100 l/s was applied to the samples during 5 min, following by four shear rates, one from 0.1-500 l/s and one other from 500-0.1 l/s, these were done twice; 15 measurements each 30 s were done.

The apparent viscosity was recorded as a function of the shear rate.

For each measurement, an aliquot (19 mL) of the emulsion sample was poured into the cup. Measures were performed three times and the average of the three replications was reported.

Soluble Protein Content

In order to characterize content in soluble proteins in the products from the invention, emulsions were centrifuged at 16,000 g at room temperature for 20 min using an Eppendorf® centrifuge 5418 (Vaudaux-Eppendorf AG®, Switzerland), one day after production. Supernatant was carefully withdrawn and stored at 4° C. in order to be analyzed by Reverse Phase-Ultra Performance Liquid Chromatography (RP-UPLC).

The UPLC system (Waters Corp Milford Mass., USA) consisted of a binary pump, a temperature controlled autosampler (sample manager-UPSMPM6R) and a photodiode array detector (UPPDA-E). The equipment was controlled by the Empower® 3 software, Pro version.

Separations were performed on a reversed-phase analytical column Acquity UPLC® BEH300 C4 1.7 µm 2.1×150 mm (Waters Corp Milford Mass., USA) and on VANGUARD™ Pre-column BEH300 C4 1.7 µm 2.1×5 mm (Waters Corp Milford Mass., USA). UPLC vials were kept at constant temperature 8° C.±2° C. and injected by the sample manager system. A 500 µL injection syringe and a 250 µL injection loop were used.

Standards of caseins were prepared at concentrations of 0.1, 0.3, 1, 3, and 5 wt. % by dilution in milliQ water from a 10 wt. % reference solution. In a 1.5 mL Eppendorf® microtube, 200 µL of the sample and 800 µL of buffer {Guanidine-HCl 7.5 M; Trisodium Citrate 6.25 mM; DTT 23 mM} were added. The sample's and buffer's masses were accurately weighted. The composition was then homogenized using a vortex and incubated in an Eppendorf® Thermomixer Compact (Vaudaux-Eppendorf AG®, Switzerland) at 60° C. for 10 min at 650 rpm.

After incubation, samples were homogenized and centrifuged at 16,000 g for 10 min at room temperature using Eppendorf® centrifuge 5418 (Vaudaux-Eppendorf AG®, Switzerland). Supernatant was then carefully withdrawn and introduced in a UPLC Vial, watching out for the fat layer and also to not suspend the pellets if presents. The injection volume was variable from 30 µL-150 µL, adapted to the sample's protein content (determined by Kjeldahl method, N×6.38) to have sufficient signal. The standards were also injected with adjusted volumes in order to consider variability.

A gradient elution was carried out with two solvents mixed during the elution. Solvent A consisted of 0.1% TFA in water and solvent B was 0.1% TFA in acetonitrile/water (90/10) (v: v). Separations were performed with a linear gradient from 15-35% B in 4 min (5% B·min−1), 35-47% B in 24 min (0.5% B·min−1) and from 47% B–80% B in 4 min (8.25% B·min−1). This was followed by an isocratic elution at 80% B during 1 min. Then returned linearly to the starting condition in 2 min, followed by the rebalance of the column for 5 min.

The flow rate was 0.6 mL·min−1 and the column temperature was kept constant at 40±1° C. The acquisition was achieved at λ=214 nm (resolution 2.4 nm–20 points/sec– Exposure time automatic).

Each chromatogram was manually integrated. For calibration curves, the total area was plotted as a function of proteins amount injected. The soluble protein content was calculated from the ratio of protein amount present in the supernatant after centrifugation and the total amount of protein present in the emulsion without centrifugation and expressed in percentage.

Results

Particle Size Distribution

Figure 2:
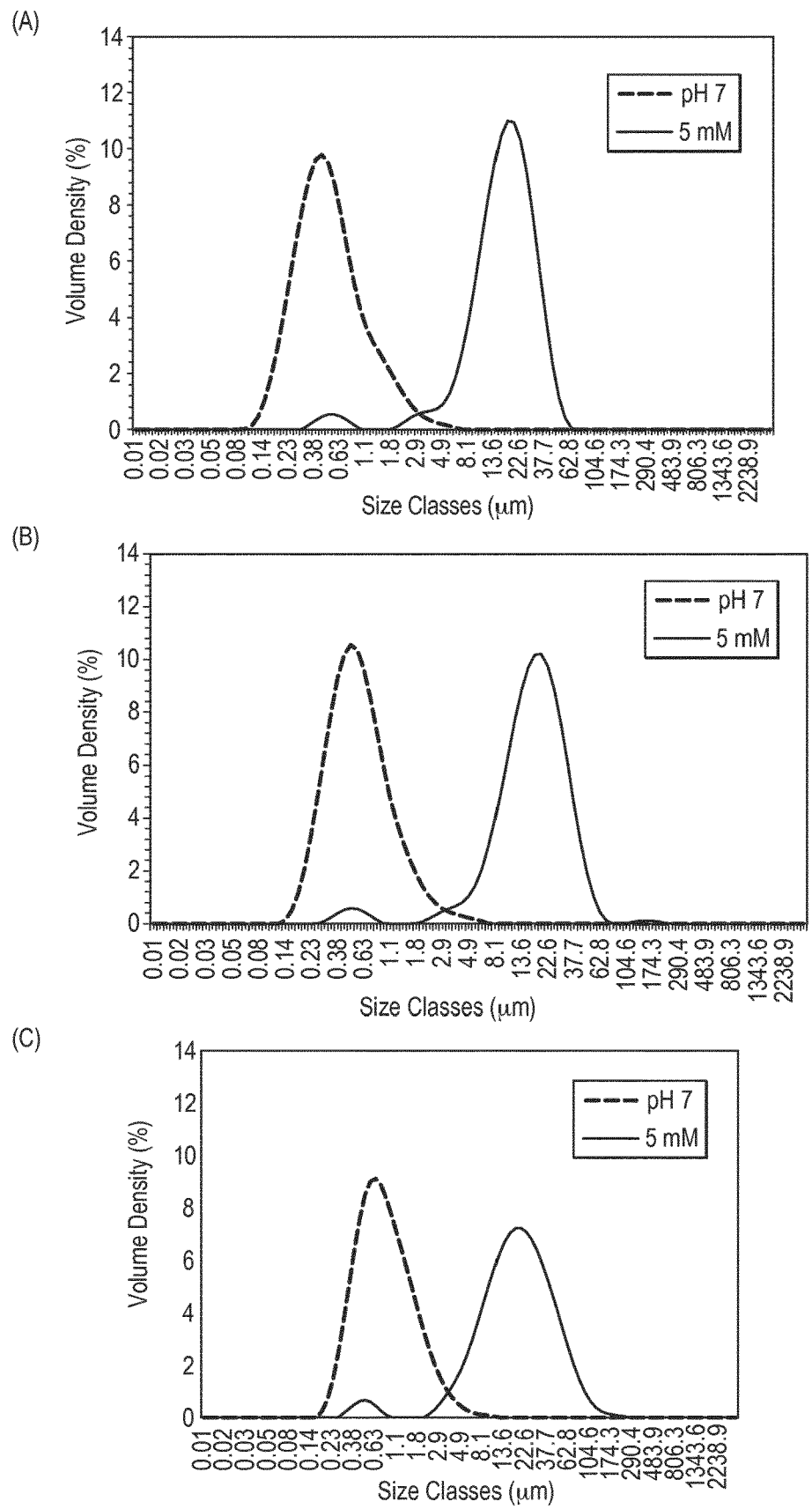
FIG. 2 shows particle size distribution of emulsions stabilized by 3 wt. % micellar casein isolate at pH 7.0 or after addition of 5 mM CaCl2 and heating at 95° C. for 15 min as described in example 2. (A) 2.5 wt. % oil emulsion, (B) 5 wt. % emulsion, (C) 10 wt. % emulsion.

FIG. 2 shows that upon heat treatment and shearing, the size distribution of the emulsions at pH 7.0 exhibit a peak around 400-600 nm for the 3 sunflower oil content tested. On the contrary, larger particles are formed when the heat treatment in achieved in presence of 5 mM added fee calcium. Hence, there is a clear shift of the size distribution to around 15-25 microns, indicating that the initial oil droplets had aggregated into larger protein based particles.

Microstructure

Figure 3:
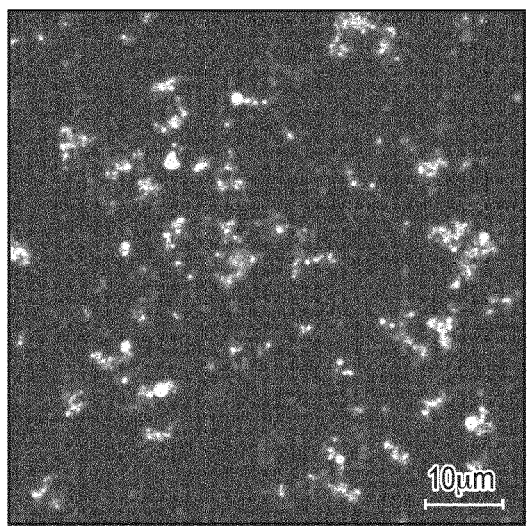
FIG. 3 shows a confocal scanning laser micrographs of 3 wt. % milk protein concentrate stabilized high oleic sunflower emulsion after heat treatment and shearing at 95° C. for 15 min at pH 7.0. (A) 2.5 wt. % oil, (B) 5 wt. % oil, (C) 10 wt. % oil. Scale bar is 10 microns.
Figure 3:
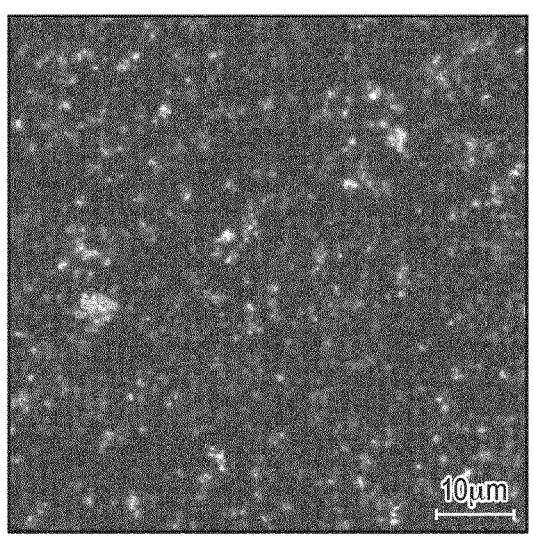
Figure 3:
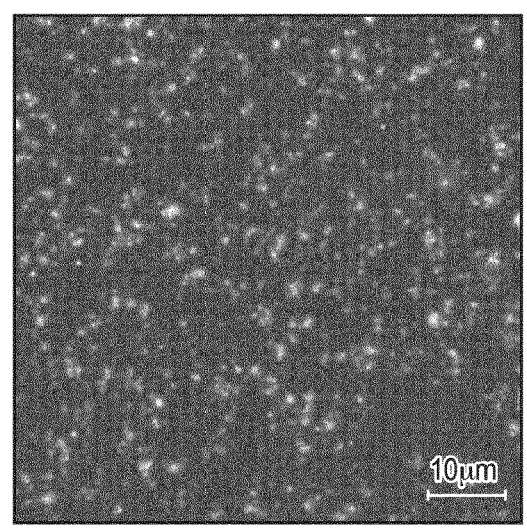
Figure 4:
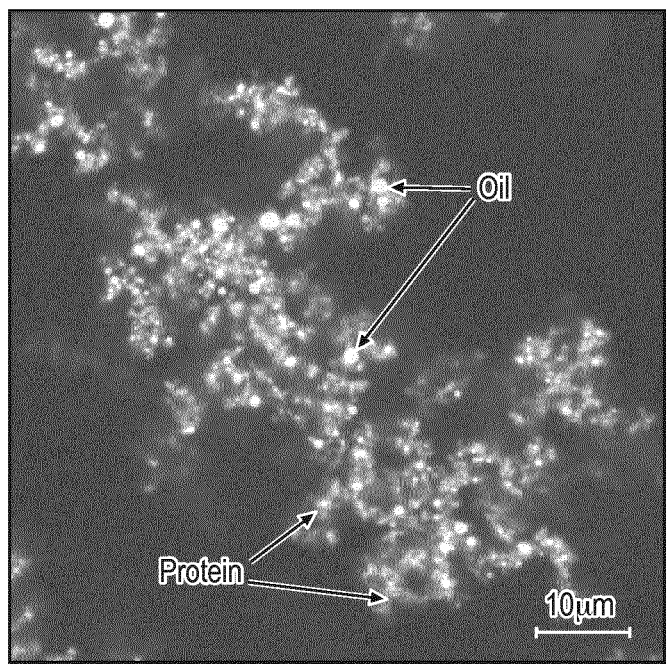
FIG. 4 shows a confocal scanning laser micrographs of 3 wt. % milk protein concentrate stabilized high oleic sunflower emulsion after heat treatment and shearing at 95° C. for 15 min in presence of 5 mM CaCl2. (A) 2.5 wt. % oil, (B) 5 wt. % oil, (C) 10 wt. % oil. Oil droplets and protein phase are shown by arrows. Scale bar is 10 microns.
Figure 4:
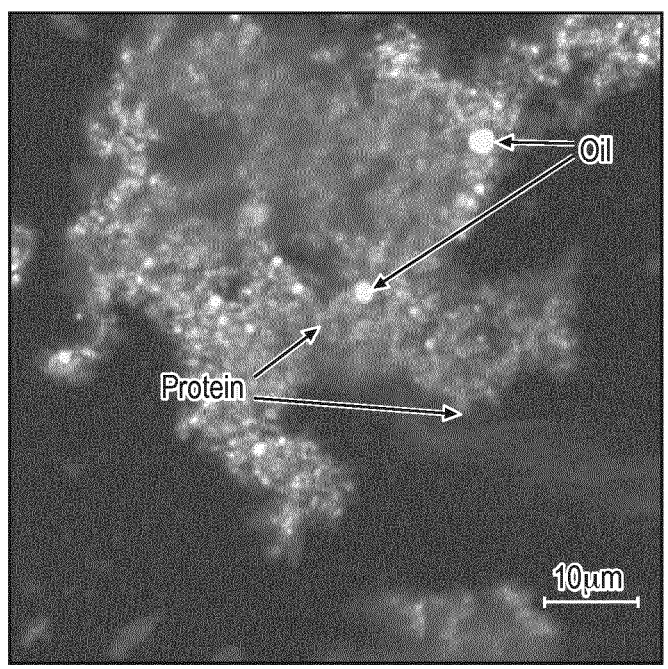
Figure 4:
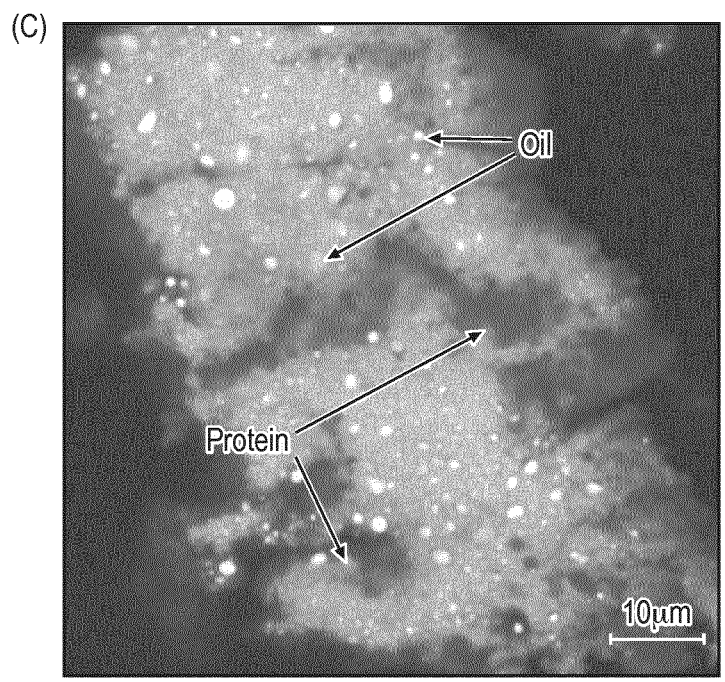

The microstructure of the protein based aggregates is clearly shown on FIG. 3. More numerous aggregates were obtained when the oil content in the emulsion was increased (FIG. 3A to 3C). Interestingly, larger magnification of the particles show that these are composed by oil droplets tightly included in a surround protein matrix (FIG. 4). The higher the sunflower oil content in the emulsion, the more compact and spherical the shape of the particles was (FIG. 4C). On the contrary, more branched and elongated particles were obtained for the lowest oil content (Figure A). The soluble protein content in the emulsion at 5 wt. % oil was found to be 76% at pH 7.0 while upon heat treatment in presence of 5 mM calcium chloride, it was found to be about 3% as revealed by UPLC analysis.

Flow Properties

Figure 5:
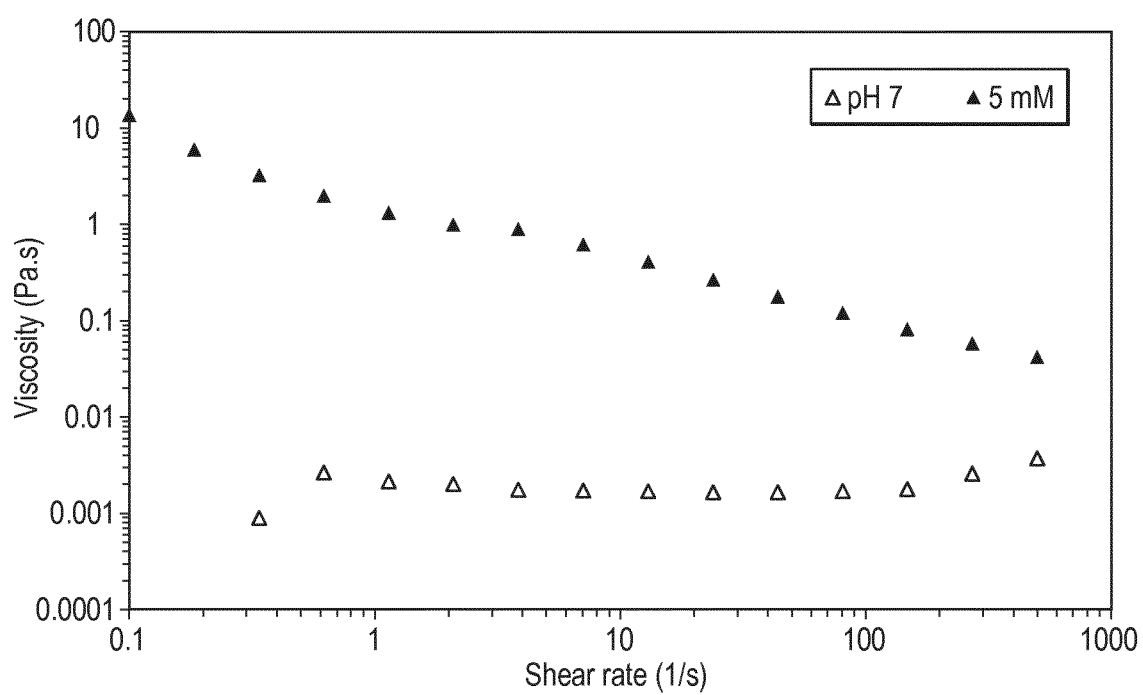
FIG. 5 shows a flow curve at 20° C. for 3 wt. % milk protein concentrate stabilized high oleic sunflower 5 wt. % emulsion after heat treatment and shearing at 95° C. for 15 min at pH 7.0 or in presence of 5 mM CaCl2.

The flow properties of emulsion produced with 5 wt. % oil was compared after heat treatment and shearing at pH 7.0 and after addition of 5 mM CaCl2. The flow properties are shown in FIG. 5.

Figure 6:
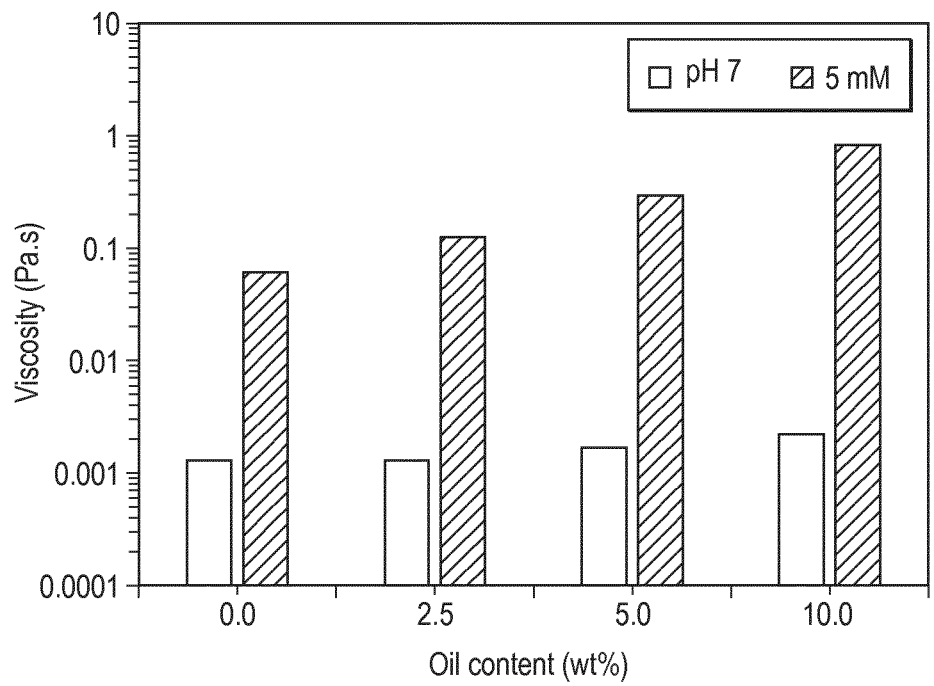
FIG. 6 shows viscosity at a shear rate of 10 s−1 for 3 wt. % milk protein concentrate stabilized high oleic sunflower emulsions after heat treatment and shearing at 95° C. for 15 min at pH 7.0 or in presence of 5 mM CaCl2.

The emulsion produced at pH 7.0 exhibited a Newtonian flow behaviour with an independence of the viscosity as a function of shear rate. This is explained by the fact that viscosity is mainly driven by the oil volume fraction and that the oil droplets are not interacting. In the sample of the present invention containing 5 mM calcium, the flow behaviour is shear thinning, which is an indication that shear sensitive particles have been produced, affecting the overall flow behaviour. The sample viscosity is compared for the 3 sunflower oil contents tested at a shear rate of 10 s−1 which is relevant for in-mouth conditions (see FIG. 6). It can be seen that at pH 7.0, the viscosity slightly increases with increasing the oil content. For samples of the present invention prepared in presence of calcium, the viscosity was about 10 to 100 times larger than the corresponding sample at pH 7.0. This clearly indicates that the particles of the present invention enables to build viscosity at a much lower oil content, enabling fat lowering in food products, see FIG. 5.

Example 3

Calcium Addition in Double Concentrated Milk, Heat Treatment and Spray Drying

Material and Methods

A set of 2 samples were produced according to the following procedure, involving: concentration of a commercial whole milk to 35% total solids (TS) content, adding a variable amount CaCl2 (5 and 10 mM) in the milk concentrate, standardized heat processing including a direct steam injection step, and spray drying to obtain a functionalized milk powder.

Commercially available, pasteurized and microfiltered, homogenized whole milk (3.5% fat content, Cremo, Le Mont-sur-Lausanne, CH) is concentrated to a total solid content as indicated in the table 2, with a Centritherm® CT1-09 thin film spinning cone evaporator (Flavourtech Inc., AU).

The concentration process is done in recirculating batch mode, starting with milk at 4° C. The milk is pumped with a progressing cavity pump, from a buffer tank through a plate heat exchanger set to 40° C. outlet temperature and the Centritherm® CT1-09 evaporator, back into the buffer tank. The milk in the buffer tank thereby gradually increases in solid concentration and temperature. When a critical concentration threshold is reached, the milk is brought to the desired total solids content by a final evaporator pass without remixing, and collected in a separate holding tank.

The following process parameters are used: flow rate 100 l/h, evaporator inlet temperature 40° C., evaporator vacuum pressure 40-100 mbar, evaporator steam temperature 90° C. This results in concentrate outlet temperatures of around 35° C., and evaporate flow rates which decrease gradually from about 50 l/h-30 l/h with increasing milk concentration. High product flow rates around 100 l/h and a stable product inlet temperature of 40° C. are important to avoid fouling of the milk concentrate on the heat exchange surface of the Centritherm® device.

The milk concentrate is cooled to 10° C. and the required amount of CaCl2, 2H2O powder (Merck, Darmstadt, Germany) was added, under agitation, to the milk. The typical timeframe for calcium powder addition to a 40 kg batch is about 15 minutes.

The cooled, calcium loaded milk concentrate was heat-processed in semi-continuous mode on a commercially available OMVE HT320-20 DSI SSHE pilot plant line (OMVE Netherlands B.V., NL). Processing steps are: preheating in the OMVE tubular heat exchanger to 60° C., direct steam injection to 95° C. outlet temperature, 300 sec hot holding period at 95° C. in the two scraped surface heat exchangers of the OMVE line, connected in series and running at maximum rpm, and subsequent cooling to about 23° C. product outlet temperature the OMVE tubular heat exchanger cooled with ice water. The flow rate is set to 14 l/h to obtain a sum of approximately 300 sec residence time in the scraped surface heat exchanger units. Residence time in the OMVE cooler is about 2 minutes. The residence times are averages from volumetric flow rates and dead volume of line elements (tubular heat exchanger, scraped surface heat exchanger).

Clogging of the DSI injector is a critical phenomenon, and the line must be carefully controlled in this respect. No flash evaporation is applied and condensing steam remains entirely in the product.

The heat-processed milk concentrate with 5 mM calcium added was spray-dried on a Niro SD 6.3 pilot plant spray tower (GEA NIRO Process Engineering, DK), equipped with a FS1 rotary atomizer. Operating parameters are: Product feed rate 10-20 kg/h, product inlet temperature in the rotary atomizer 25-30° C., rotary atomizer speed 25000 rpm, airflow 350-400 kg/h (mass flow control), air inlet temperature 160° C., exhaust air temperature 80° C. and exhaust air relative humidity 15%. The finished powder product is packed immediately in air-tight bags and has a residual humidity below 4%.

The same methods as those used in example 2 were used to characterize sample size distribution, microstructure and flow properties. For the experiments carried on spray dried powder containing 5 mM CaCl2, sample was reconstituted to 13 or 50% TS before measurements. Distilled water was poured into a beaker and heated up to 42° C.-44° C. with a water bath. A volume of 150 mL distilled water at 42° C.-44° C. was measured and transferred into a glass beaker using a volumetric cylinder. An amount of 22.5 g milk powder is added to the 150 ml distilled water at 42° C. and mixed with a spoon for 30 s.

Results

Liquid Samples

TABLE 2

Mean average diameters $D_{43}$ and $D_{32}$ and viscosity at a shear rate of 13 s$^{-1}$ measured at 25° C. for double concentrated milk (25% TS) before and after heat treatment in presence of CaCl$_2$ at 95° C. for 300 s.

| Sample | pH | D (4, 3) (microns) | D (3, 2) (microns) | Shear viscosity at 13 s$^{-1}$ (mPa · s) |
|---|---|---|---|---|
| Non-heated 25% TS milk 5 mM CaCl$_2$ | 6.38 | 0.836 | 0.569 | 6.2 |
| Heated 25% TS milk 5 mM CaCl$_2$ | 6.39 | 28.40 | 9.42 | 349 |
| Non-heated 25% TS milk 10 mM CaCl$_2$ | 6.23 | 0.816 | 0.542 | 4.23 |
| Heated 25% TS milk 10 mM CaCl$_2$ | 6.24 | 66.80 | 11.20 | 150 |

It can be seen from table 2 that the samples of the present invention were exhibiting a marked increase in particle size after heat treatment leading to an increase in viscosity. It can be seen that in the presence of 10 mM calcium chloride addition, the D(4,3) increased to 66.8 microns which was leading to a slight sandiness of the sample. For this milk concentration, the best conditions and aggregation profile were obtained with 5 mM CaCl2 addition which can be inferred also by the higher viscosity reached (349 mPa·s) compared to 10 mM CaCl2 addition (150 mPa·s). After spray drying, the samples have been characterized upon reconstitution in MilliQ water.

Particle Size Distribution

Figure 7:
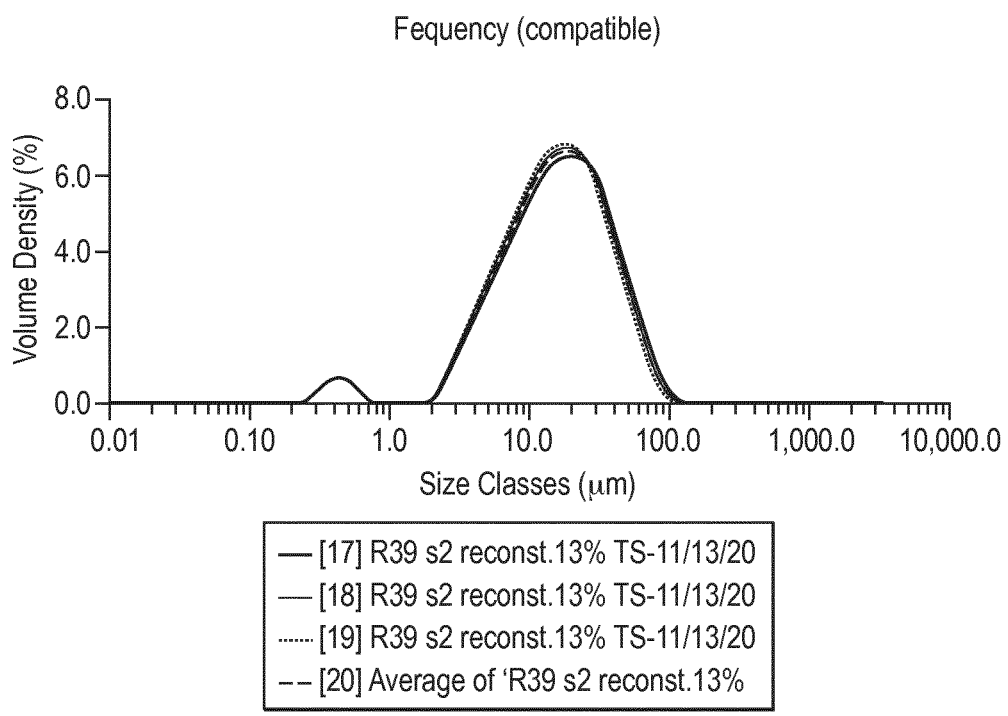
FIG. 7 shows the particle size distribution of double concentrated milk heated in presence of 5 mM calcium chloride after reconstitution of powder to 13% total solids.

The distribution of particles upon reconstitution is exhibiting a peak at about 20 microns (see FIG. 7) which is very close to the particle size obtained before spray drying (D(4,3)=28.4 microns, Table 2). The slight reduction in particle size might be due to the shearing effect occurring during the spray drying of the product. Surprisingly, the soluble protein content obtained after reconstitution of the powder at 13% TS was 7% of the total proteins, indicating that the majority of the milk proteins were involved in the aggregate structure.

Microstructure

Figure 8:
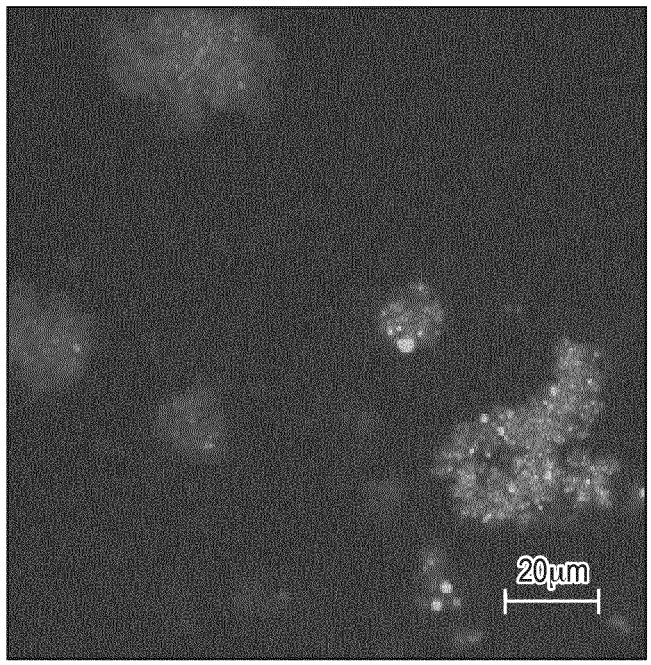
FIG. 8 shows a confocal scanning laser micrographs of double concentrated milk heated in presence of 5 mM calcium chloride after reconstitution of powder to 13% total solids. Scale bars are 20 and 10 microns on (A) and (B), respectively.
Figure 8:
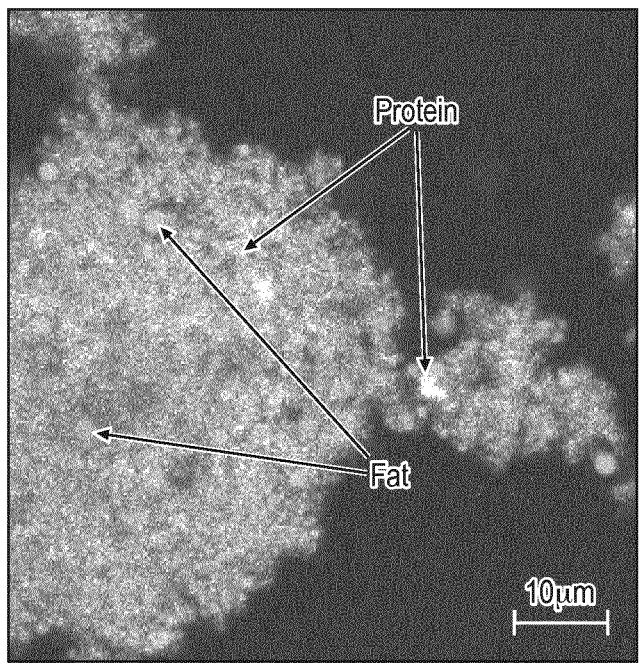

The microstructure of the particles can be seen on FIGS. 8A and B. Aggregates were rather compacts and were composed of proteins and fat droplets with no sign of non-reacting proteins which is confirming the low amount of soluble proteins. Higher magnification of the particles on FIG. 8B shows well embedded fat droplets with an average size of 1-2 microns embedded in a dense protein matrix. There is little sign of fat droplet coalescence indicating that aggregate formation arose from a flocculation mechanism.

Flow Properties Upon Reconstitution at 50% TS

Figure 9:
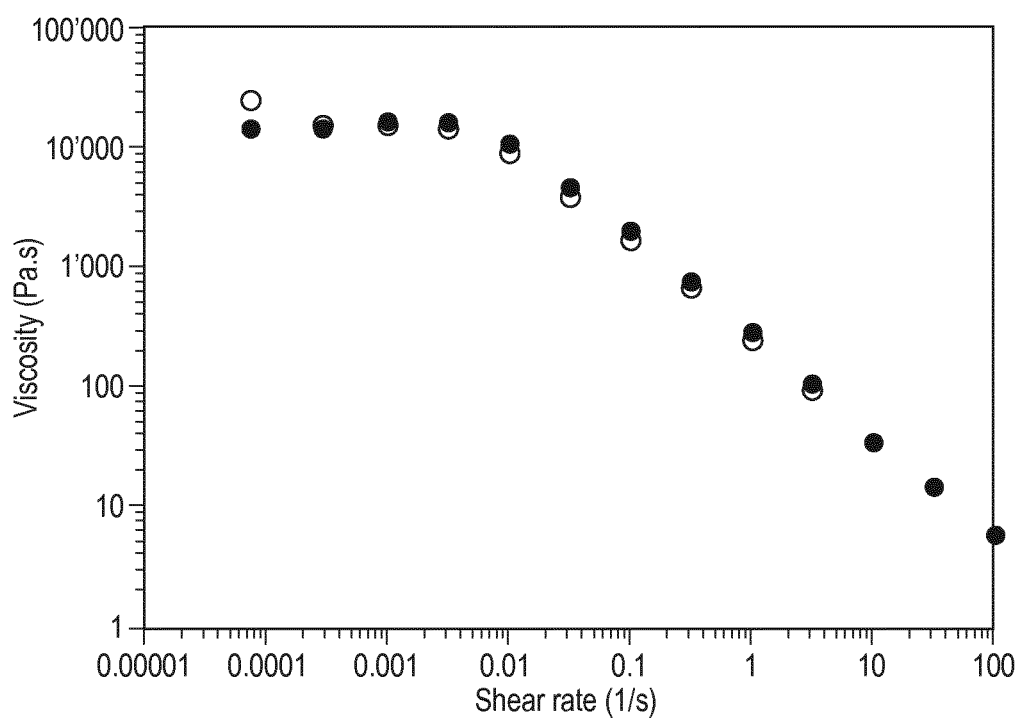
FIG. 9 shows a flow curve at 25° C. for 50% TS reconstituted milk powder from the invention with 5 mM calcium chloride added. Open circles: flow curve with increasing shear rate (up). Close circles: flow curve with increasing shear rate (down).

The milk spray dried powder according to the present invention was reconstituted to 50% TS which is generally the TS at which full fat milk is spray dried. It can be seen of FIG. 9 that the flow behavior is strongly shear thinning, exhibiting a steep negative slope and a high low shear viscosity. This is a sign that the product upon reconstitution had built some structure and that protein aggregates were able to interact between each other. Surprisingly, the structure could be recovered upon releasing the stress on the sample as the up and down curves were almost superimposed.

Example 4

Calcium Addition in Triple Concentrated Milk, Heat Treatment and Spray Drying

Material and Methods

Reference Milk

Commercially available, pasteurized, homogenized whole milk (3.5% fat content, Emmi, Lucerne, CH) was concentrated by a Scheffers 3 effects falling film evaporator (from Scheffers B.V.) to 50% total solids. The milk concentrate is cooled by a plate heat exchanger to 4° C. and pH of homogenized liquid milk concentrate was measured to be 6.5. The composition is preheated again to 60° C. by a plate heat exchanger and subsequently heated to 85° C. by direct steam injection system (self-construction of Nestlé) with a holding time of 15 seconds. After the heat treatment, the milk concentrate is rapidly cooled down by a 3VT460 CREPACO scrape heat exchanger (from APV Invensys Worb) to 40° C. The milk concentrate is then spray dried on a Nestlé 3.5 m Egron (self-construction) by a two-phase nozzle system (1.8 mm nozzle) to maximal moisture content of 3% and packed into air tight bags. Conditions of spray drying were: product flow of 413 kg/h at 37° C. product temperature, hot air inlet temperature of 270° C. and an air flow of 4664 kg/h, outlet air temperature of 88° C.

Sample of the Present Invention

Commercially available, pasteurized, homogenized whole milk (3.5% fat content, Emmi, Lucerne, CH) was concentrated by a Scheffers 3 effects falling film evaporator (from Scheffers B.V.) to 37% total solids. The milk concentrate is cooled by a plate heat exchanger to 4° C. and 6.5 mM calcium chloride is added. The calcium adjusted milk concentrate is preheated again to 60° C. by a plate heat exchanger and subsequently heated to 95° C. by direct steam injection system (self-construction of Nestlé) with a holding time of around 300 seconds. After the heat treatment, the milk concentrate is rapidly cooled down by a 3VT460 CREPACO scrape heat exchanger (from APV Invensys Worb) to 40° C. The milk concentrate is then spray dried on a NIRO SD6 3N spray dryer by a rotary disc nozzle system at 17,000 rpm to maximal moisture content of 3% and packed into air tight bags.

Conditions of spray drying were: product flow of 20 L/h at 40° C. product temperature, hot air inlet temperature of 160° C. and an air flow of 360 m³/h, outlet air temperature of 80° C.

Size Distribution Measurements

The milk powders of the present invention were compared to the above references and were characterized by laser diffraction in order to determine particle size distribution (PSD=Particle Size Distribution)

Powdered samples were reconstituted before measurements. Distilled water was poured into a beaker and heated up to 42° C.-44° C. with a water bath. A volume of 150 mL distilled water at 42° C.-44° C. was measured and transferred into a glass beaker using a volumetric cylinder. An amount of 22.5 g milk powder is added to the 150 ml distilled water at 42° C. and mixed with a spoon for 30 s.

Dispersion of the liquid or reconstituted powder sample in distilled or deionised water and measurements of the particle size distribution by laser diffraction.

Measurement settings used are a refractive index of 1.46 for fat droplets and 1.33 for water at an absorption of 0.01. All samples were measured at an obscuration rate of 2.0-2.5%.

Flow Properties

Samples were reconstituted to 50% TS using the process described above. Flow experiments were performed using a controlled stress rheometer Physica MCR501 (Anton Paar®, Austria) with concentric cylinders geometry CC27-SS/S (diameter=27 mm, gap=1.14 mm by Anton Paar®, Austria).

Steady state flow measurements were conducted in a constant temperature of 25° C., a shear stress of 100 l/s was applied to the samples during 5 min, following by four shear rates, one from 0 to 100 l/s and one other from 100 to 0 l/s, these were done twice; 15 measurements each 30 s were done. The apparent viscosity was recorded as a function of the shear rate.

For each measurement, an aliquot (19 mL) of the emulsion sample was poured into the cup. Measures were performed three times.

Results

Particle Size Distribution

Figure 10:
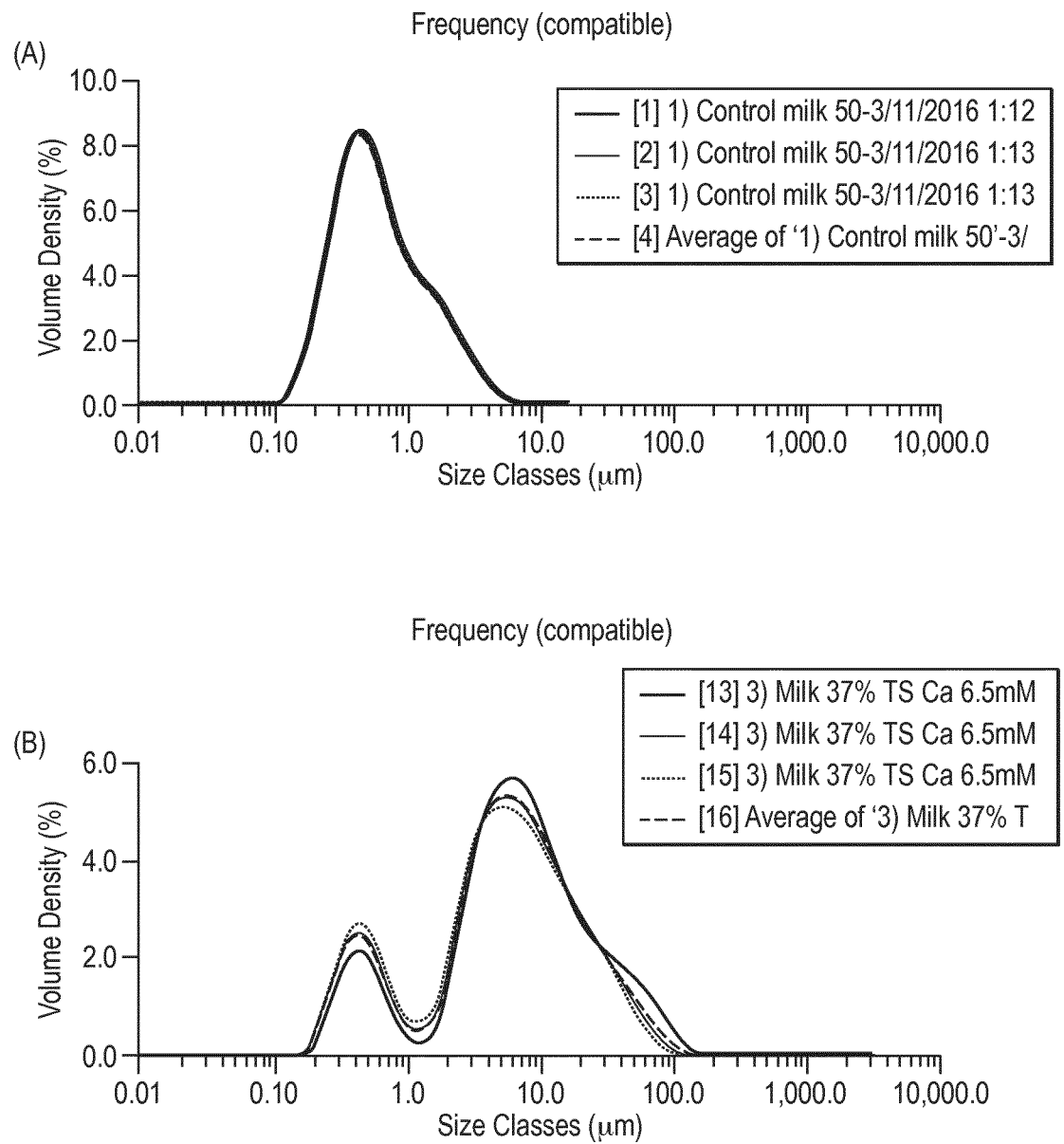
FIG. 10 shows the particle size distribution of control milk dried at 50% TS (A) and sample from the present invention (B) dried at 37% TS in presence of 6.5 mM CaCl2 after reconstitution at 13% TS.

The size distribution of full fat milk spray dried at 50% TS was determined after reconstitution to 13% TS (FIG. 10). It can be seen on FIG. 10A that a major peak was found 0.5 micron, followed by a tailing up to 6 microns. This indicates that the milk fat droplets and the micellar casein from milk are concomitantly measured that that no significant aggregation had occurred in the system. For the sample of the present invention that was treated in presence of 6.4 mM added calcium chloride, the size distribution was shifted to larger particle diameters. The D(4.3) reached 11 microns accounting for the presence of protein aggregates, while a small residual peak about 0.5 microns probably accounted for unreacted micellar caseins (FIG. 10B). The levels of soluble proteins were 33.5% in the control milk sample while it was 15.5% in the sample produced in the presence of added calcium. This shows again that the present invention favors the protein aggregation and the entrapment of oil droplets in the protein aggregates.

Flow Properties

Figure 11:
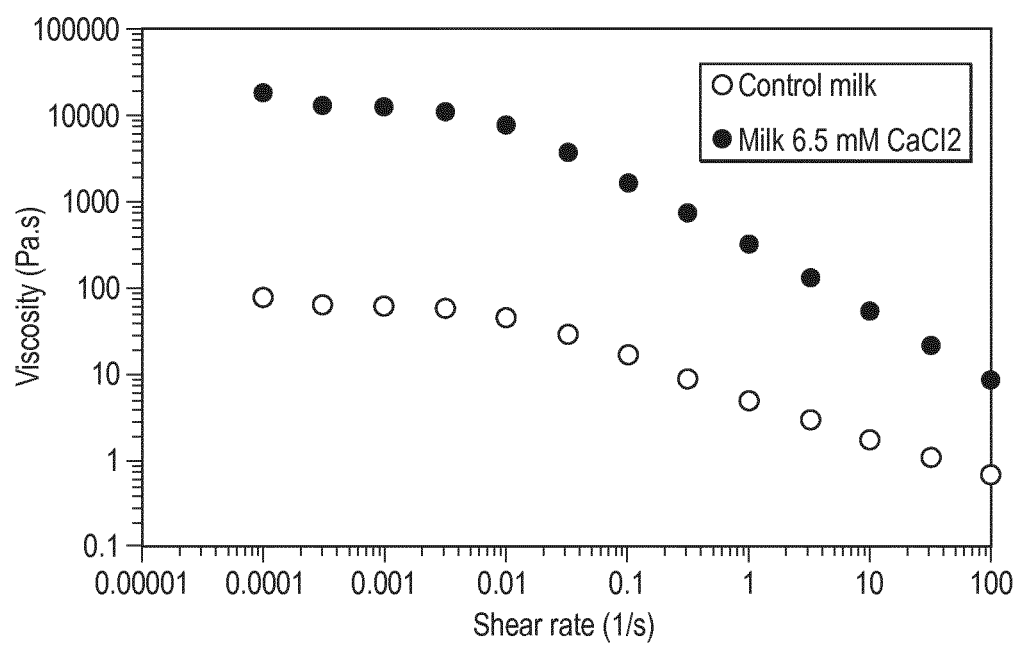
FIG. 11 shows a flow curve at 20° C. for control milk dried at 50% TS and sample from the present invention dried at 37% TS in presence of 6.5 mM CaCl2 after reconstitution at 50% TS.

The two milk powders were reconstituted to 50% TS and their flow properties were compared. Control full fat milk that was spray dried at 50% TS exhibited a shear thinning behavior and a low shear viscosity plateau about 100 Pa·s (see FIG. 11). The milk from the present invention, when reconstituted at 50% TS as well exhibited a shear thinning profile, but the low shear viscosity was 100 times larger and the shear thinning region had a much stronger slope. This is a sign of highly structured sample as well as the proof of interaction between the protein aggregates. It shows also that the present invention is clearly able to generate higher viscosity at equivalent fat content and has therefore potential for fat reduction in food products.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of producing a dairy concentrate, the method comprising:
    providing an ingredient composition comprising micellar caseins and whey proteins, the ingredient composition having a pH of 6.1-7.1 and comprising 3-25 wt. % of proteins, wherein the ingredient composition has a weight ratio of the micellar caseins to the whey proteins in a range of 90/10-60/40;
    adding 3-25 mM divalent cations to provide a concentration of 3-8 mM free divalent cations in the ingredient composition;
    homogenising the ingredient composition; and subsequently
    pasteurising and stirring the ingredient composition at a temperature of 80°–105° C. for a period of 0.5-3 minutes to form agglomerated proteins comprising the micellar caseins and beta-lactoglobulin from the whey proteins, the agglomerated proteins having a size of 3-50 microns as measured by $D_{(4,3)}$ mean diameter.

2. The method according to claim 1, wherein the agglomerated proteins have the size of 5-30 microns.

3. The method according to claim 1, wherein the divalent cations are selected from the group consisting of Ca cations, Mg cations, and combinations thereof.

4. The method according to claim 1, wherein the divalent cations are added to the ingredient composition until the concentration of the free divalent cations in the ingredient composition is in the range of 3.5-6.5 mM.

5. The method according to claim 1, wherein the divalent cations are added in a mineral salt.

6. The method according to claim 5, wherein the mineral salt is selected from the group consisting of calcium chloride, calcium lactate, calcium gluconate, calcium phosphate, and mixtures thereof.

7. The method according to claim 1, wherein the pH of the ingredient composition is 6.2-7.1 before adding the divalent cations.

8. The method according to claim 1, wherein a content of soluble protein in the ingredient composition is below or equal to 30% in relation to total protein content.

9. The method according to claim 1, wherein the ingredient composition comprises 0-50 wt. % fat.

10. The method according to claim 1, wherein the micellar caseins and the whey proteins in the ingredient composition are provided in a form selected from the group consisting of raw milk, pasteurized milk, low heat concentrated milk, low heat milk powder, milk protein concentrate, milk protein isolate in liquid format, milk protein isolate in powder format, and a combination thereof.

11. The method according to claim 1, wherein the dairy concentrate is a concentrate comprising 6-55 wt. % milk solids.

12. The method according to claim 11, wherein the concentrate is dried into powder by means of freeze drying, spray drying or roller-drying.

13. The method according to claim 10, wherein the ingredient composition comprises additional whey proteins provided in a form selected from the group consisting of raw milk, pasteurized milk, low heat concentrated milk, low heat milk powder, milk protein concentrate, milk protein isolate in liquid format, milk protein isolate in powder format, and a combination thereof.

14. A method of producing a dairy concentrate, the method comprising:
    providing an ingredient composition comprising micellar caseins and whey proteins, the ingredient composition having a pH of 6.1-7.1 and comprising 3-25 wt. % of proteins, wherein the ingredient composition has a weight ratio of the micellar caseins to the whey proteins in a range of 90/10-60/40;
    adding 3-25 mM divalent cations to provide a concentration of 3-8 mM free divalent cations in the ingredient composition;
    homogenising the ingredient composition; and subsequently
    pasteurising and stirring the ingredient composition at a temperature of 120°-150° C. for a period of 3-30 seconds to form agglomerated proteins comprising the micellar caseins and beta-lactoglobulin from the whey proteins, the agglomerated proteins having a size of 3-50 microns as measured by $D_{(4,3)}$ mean diameter.

15. A dairy concentrate comprising aggregated proteins comprising aggregates of micellar casein and whey protein, wherein:
    the dairy concentrate has a pH of 6.0-7.1, comprises 6-55 wt. % milk solids, has a weight ratio of the micellar casein to the whey protein in a range of 90/10-60/40, and comprises 3-8 mM free divalent cations, wherein the aggregates have a mean diameter $D_{(4,3)}$ of 3-50 microns as measured by laser diffraction.

* * * * *